United States Patent Office 3,362,619
Patented Jan. 9, 1968

3,362,619
CONNECTING DEVICES
James Brown, Fleet, England, assignor to Power Jets (Research & Development) Limited, London, England, a British company
Filed Oct. 18, 1965, Ser. No. 497,133
Claims priority, application Great Britain, May 11, 1965, 19,761/65
3 Claims. (Cl. 230—69)

ABSTRACT OF THE DISCLOSURE

A connecting device for connecting together a cylindrical tubular member and another member in axial alignment therewith in such a manner that radial expansion of one member is permitted relative to the other without producing any substantial relative axial movement of the two members under conditions where the two members are at different temperatures is provided in the form of a hollow right circular cone or frustum of a cone connected between the two members and shaped according to the formula sine $\theta$ equals $\frac{1}{2} l/r$, $r$ being the base radius, $l$ being the slant length and $\theta$ being equal to $\frac{1}{2}$ the cone angle.

---

The present invention relates to connecting devices for connecting together a cylindrical tubular member and another member in axial alignment therewith in such manner that radial expansion of one member is permitted relative to the other without producing any substantial relative axial movement of the two members when the structure adjacent the attachment of one member to the connecting device attains a temperature different from that existing at the structure adjacent the attachment of the other member to the connecting device.

The pressure exchanger art is one art in which such a connecting device finds an application.

According to the invention a rotor includes a cylindrical tubular member, a shaft and a connecting device which consists of a hollow, right circular cone or frustum thereof having a base of radius $r$, a slant length $l$ and an angle $\theta$ where $\theta$ is half the cone angle and sin $\theta = \frac{1}{2} l/r$ the tubular member, the connecting device and the shaft being arranged co-axially with the base of the device secured around its periphery to the tubular member and the other end of the device secured to the shaft.

Figure 1:
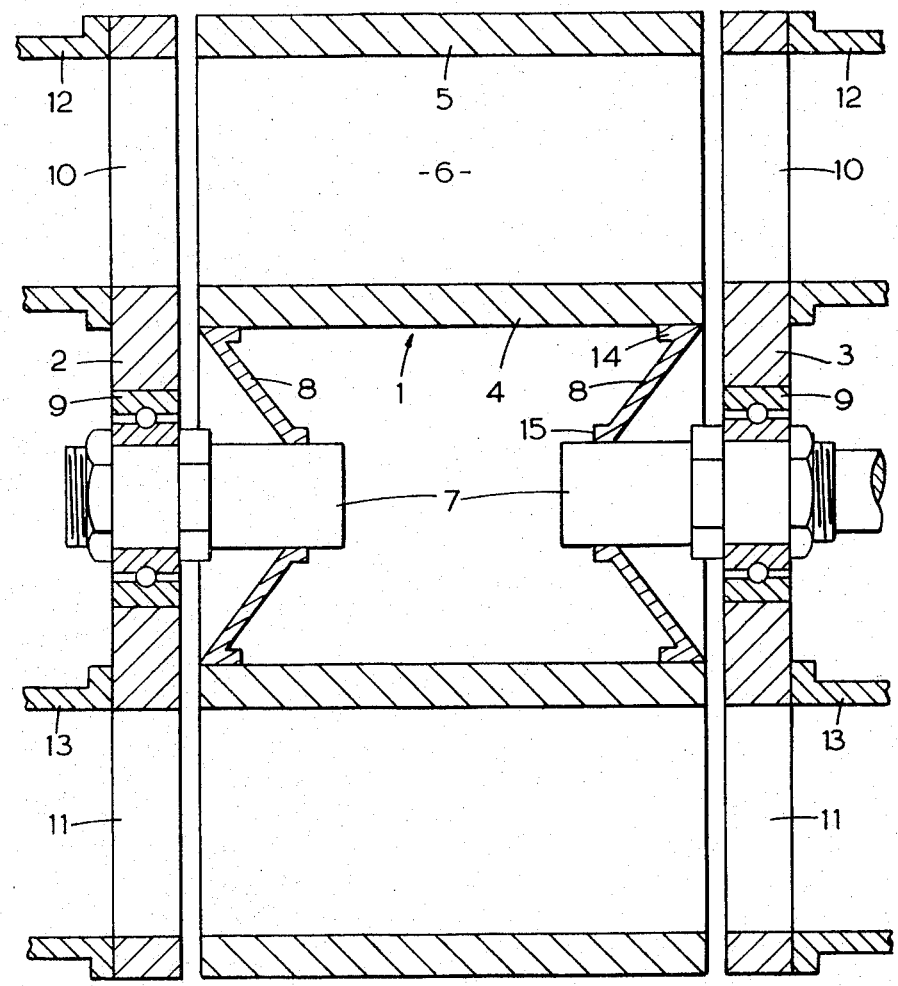
Figure 2:
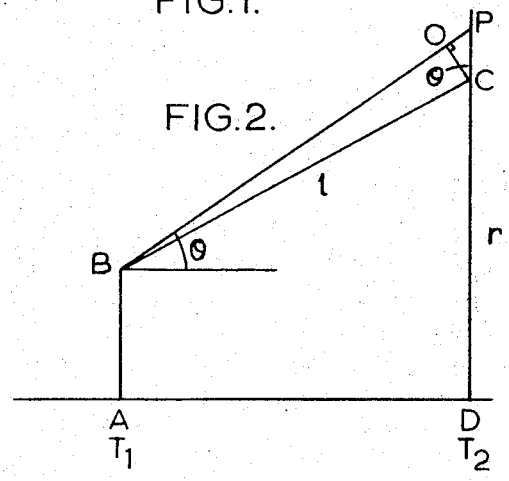

An embodiment of the present invention will now be described, by way of example, with reference to the accompanying diagrammatic drawing in which:

FIGURE 1 is a longitudinal section of a pressure exchanger incorporating a rotor according to the invention, and FIGURE 2 illustrates the principle of construction of the rotor.

FIGURE 1 shows a pressure exchanger comprising a cell ring 1 mounted for rotation between end-plates 2, 3 which form part of a surrounding casing. The cell ring 1 is formed of an inner tubular member 4 mounted co-axially of an outer tubular member 5 by means of a plurality of equi-angularly spaced walls 6 which divide the annular space between the members 4, 5 into open-ended cells. Stub-shafts 7 are secured to the ends of the cell ring 1 by connecting device 8 and each shaft 7 is mounted in a bearing 9 secured in the adjacent end-plate.

Both end-plates 2, 3 have sector-shaped ports 10, 11 through which the cells of the cell ring 1 can communicate with ducts 12, 13 respectively.

Each connecting device 8 consists of a hollow, thin walled, frustum of a cone with its base 14 secured around its periphery to the inner member 4 and its top 15 secured to the shaft 7. The dimensions of the devices 8 are such that sin $\theta = \frac{1}{2} l/r$ where $\theta$ is half the cone angle, $l$ is the slant length between the base and the top of the device and $r$ is the radius of the base of the device.

In operation the cell ring 1 is caused to rotate between the end plates 2, 3 thus effecting relative motion between the cells and the ducts 12, 13 which lead gas at different pressures steadily to and from the cells wherein one gas quantity expands, so compressing another gas quantity with which it is in direct contact.

It is essential, if this operation is to be efficient, that the clearances between the end-plates 2, 3 and the adjacent ends of the cell ring 1 be maintained as small as possible to restrict leakage of the gas through the clearances. To maintain these clearances when hot gases are being employed it is necessary to make allowances for thermal expansion of the pressure exchanger parts and particularly for differential expansion of the parts. For example, if in the present construction the temperature of the cell ring 1 adjacent the base 14 of the device is higher than that of the shaft 7, the cell ring 1 will expand radially more than the shaft 7.

It is well known to employ a generally cone-shaped member to permit two co-axially arranged structures to expand radially while maintaining the structures co-axially. However, in permitting this radial expansion one structure is caused to move axially relative to the other.

The rotor according to the present invention includes the connecting device which permits relative radial expansion between the shaft and tubular member causes no substantial change in the relative axial positions of the shaft and tubular member.

The principle of construction of the rotor according to the invention can best be understood from FIGURE 2 where A, B, C, D represent one half of an axial section of the connecting device of the rotor. The connecting device has a slant length $l$, represented by the line BC, a base of radius $r$, represented by line CD, and an angle of $\theta$. The material from which the device is constructed has a coefficient of linear expansion of $\alpha$.

If it is assumed that the device is initially at a temperature $T_1°$ and that the temperature of the base of the device is subsequently raised to $T_2°$ then the base of the device will be $(T_2-T_1°)$ higher than the top of the device and the average of the temperature gradient between the base and the top will be $(T_2-T_1°)/2$.

Both $l$ and $r$ will increase in length and if CD is not to move axially the slant length of the device must take up the position BP where P is a point on the continuation of DC. Point C is joined to a point O on BP forming a right angled triangle COP. If it is assumed that the increase in length of BC due to expansion is small compared with BC, the side OP of the triangle represents the increase in $l$ and PC is the increase in $r$ and angle OCP is equal to half the cone angle $\theta$ of the device.

Therefore, sin $\theta = OP/CP$
But $OP = l.\alpha. (T_2-T_1)/2$
and $CP = r.\alpha. (T_2-T_1)$ Thus, $$\sin \theta = \tfrac{1}{2} l/r$$

I claim:
1. A rotor including a cylindrical tubular member, a shaft and a device connecting the tubular member and shaft, the shaft and connecting device being arranged in co-axial alignment, the connecting device consisting of a hollow, right circular cone or frustum thereof having a base of radius $r$, a slant length of $l$ and an angle $\theta$ where $\theta$ is half the cone angle and sine $\theta = \tfrac{1}{2} l/r$, the base of the connecting device being secured around its periphery to the tubular member while the other end of the device is secured to the shaft.

2. A rotor according to claim 1, wherein the tubular member is a cell ring of a pressure exchanger.

3. A pressure exchanger incorporating a rotor according to claim 1.

References Cited

UNITED STATES PATENTS 2,687,843    8/1954    Alcock      230—69

ROBERT M. WALKER, *Primary Examiner.*